Figure 1:
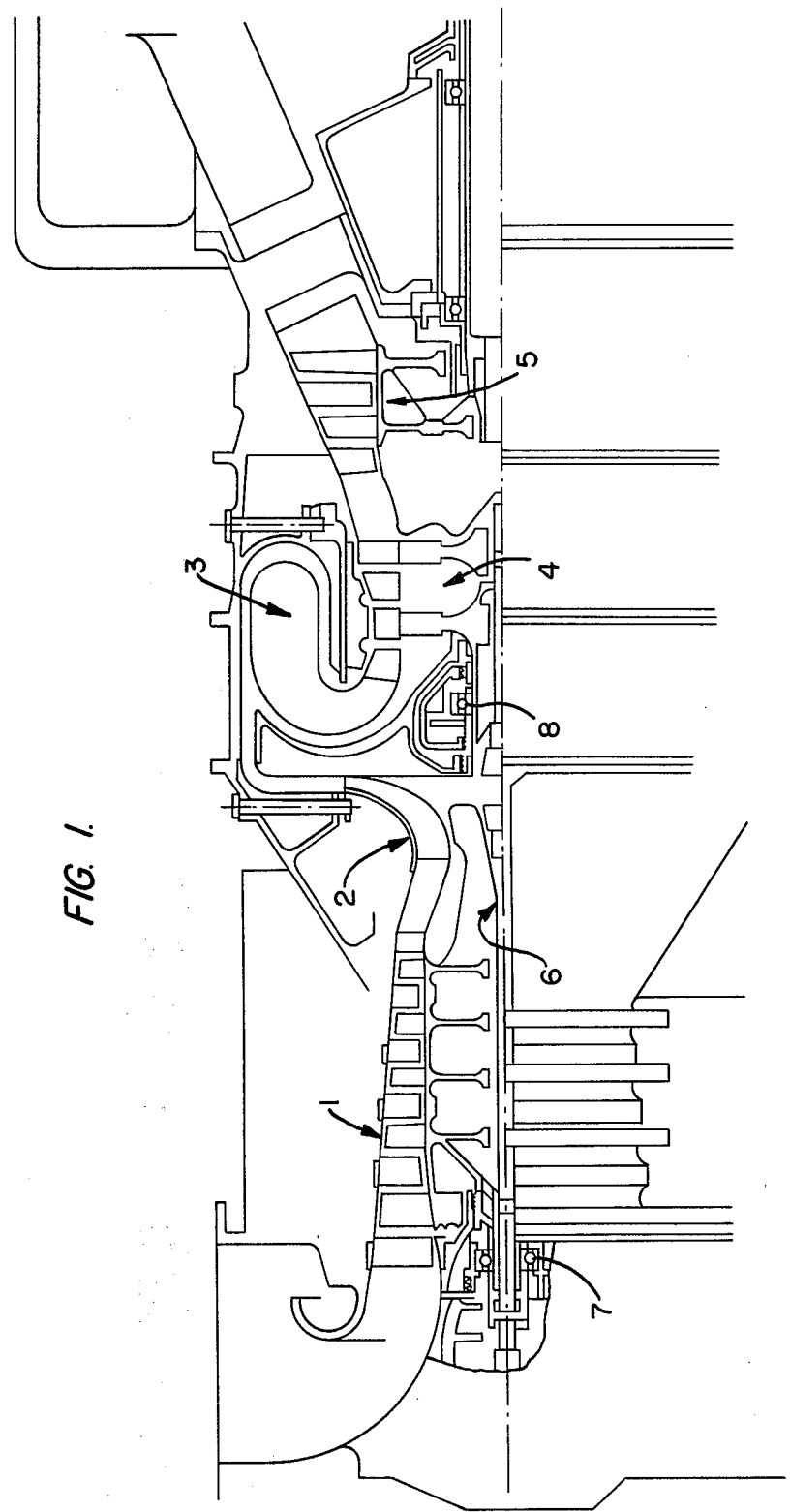

United States Patent [19]

Weiler

[11] 4,147,026

[45] Apr. 3, 1979

[54] GAS TURBINE ENGINE

[75] Inventor: Wolfgang Weiler, Dachau, Fed. Rep. of Germany

[73] Assignee: Motoren-und Turbinen-Union München GmbH, Fed Rep. of Germany

[21] Appl. No.: 835,539

[22] Filed: Sep. 22, 1977

[30] Foreign Application Priority Data

Sep. 22, 1976 [DE] Fed. Rep. of Germany ....... 2642593

[51] Int. Cl.² .................................................. F02C 7/06
[52] U.S. Cl. .................................... 60/39.08; 60/39.36
[58] Field of Search ................. 60/39.08, 39.16, 39.31, 60/39.32, 39.36

[56] References Cited

U.S. PATENT DOCUMENTS

| 2,439,273 | 4/1948 | Silvester | 60/39.08 |
| 3,014,694 | 12/1961 | Paul et al. | 60/39.36 |
| 3,088,278 | 5/1963 | Franz | 60/39.36 |
| 3,546,880 | 12/1970 | Schwaar | 60/39.16 |
| 3,623,318 | 11/1971 | Shank | 60/39.36 |

Primary Examiner—Louis J. Casaregola
Attorney, Agent, or Firm—Craig & Antonelli

[57] ABSTRACT

A gas turbine engine which includes one of a radial compressor or a combined axial-radial compressor, a reversing annular combustion chamber, a compressor drive turbine and a gas generator rotor. The gas generator rotor is rotatably mounted in the gas turbine engine by way of at least one movable bearing and a fixed bearing. A bearing spider is provided for the fixed bearing and is disposed behind the radial compressor and in front of the compressor drive turbine. The bearing spider is designed with a box construction so as to resist axial forces.

16 Claims, 2 Drawing Figures

GAS TURBINE ENGINE

The present invention relates to a gas turbine engine and, more particularly, to a small gas turbine engine provided with a radial compressor or a combined axial-radial compressor, a reversing annular combustion chamber, a compressor drive turbine and, possibly, a free-power turbine which is mechanically independent of the compressor drive turbine with a gas generator rotor being mounted in a fixed bearing and in at least one additional movable bearing.

Small gas turbine engines, especially gas turbine engines with radial compressors or combined axial-radial compressors are usually designed so that a fixed bearing of a gas generator rotor is located in a vicinity of the compressor inlet. While such location provides advantages considering design features of the rotor mounting in the hot area, the design features also pose definite disadvantages with respect to the efficiency of the operation of the gas turbine engine, the operating characteristics of such engine, as well as the safety of the engine. These disadvantages become particularly more evident if the gas turbine engine is designed without an inlet bearing spider as, for example, with a radial or lateral air intake gas turbine engine.

The above-noted disadvantages occur as a result of thermal expansions of the rotor and stator, which expansions are a function of the direction, magnitude and time of operation and which influence, in particular, the efficiency and the pumping action of the radial compressor. Moreover, of equal importance, the spaces between the rotor and cover plate have a negative influence to axial misalignment between the rotor and a radial part of the diffuser.

Additionally, the efficiency and operating characteristics of the axial part of the compressor and, possibly, also the feed of the cooling air to the turbine rotor blades to be cooled are unfavorably influenced since, in the first instance, depending on the design of the compressor, the radial play between the rotor blades and the housing and/or between the guide blades and the rotor must be increased unnecessarily and, in the second instance, the function of the labyrinth seals in the vicinity of the cooling air feed to the turbine rotor blades is affected, which easily leads to an over-heating of the turbine blading.

The aim underlying the present invention essentially resides in improving a gas turbine engine of the aforementioned type so as to provide for a cost effective mounting of the bearings as compared with the prior art.

For this purpose, according to one advantageous feature of the present invention, a fixed bearing of the gas generator rotor is disposed behind the radial compressor and in front of the compressor turbine, as viewed in a flow direction, with a bearing spider being provided and having a box-like construction so as to enable the withstanding of axial forces.

Preferably, according to another feature of the present invention, the bearing spider is constructed of two separate components which are associated with radial and axial diffusers of the radial compressor with the two components being secured together by at least two flanges arranged at different diameters with respect to a longitudinal axis of the gas turbine engine. One of the components forms a forward component and includes a section of the radial compressor diffuser which is subject to a radial flow and an elbow which deflects the flow 90° to create an axial flow. The other component forms a rear component and includes a section of a radial compressor diffuser which is subject to axial flow and a complete bearing box of the fixed bearing with all associated seals and supply lines to the fixed bearing. Advantageously, the rear component can be fashioned as a casting.

In accordance with yet another feature of the present invention, the axial part of the radial compressor diffuser and the bearing box of the fixed bearing are connected by an approximately conical shell which simultaneously separates a combustion chamber area from a compressor area. One or more hollow ribs are provided on the compressor side of the conical shell and act as additional reinforcement against axial deformation of the rear component. Moreover, the hollow ribs may form all of the supply lines for the fixed bearing.

One advantage of the present invention resides in the fact that negligibly small axial deformations occur between the hot bearing and the housing of the machine, even with high pressure differentials between the combustion chamber and compressor sides and/or with high axial forces acting on the rotor bearing.

Another advantage of the present invention resides in the fact that negligible axial misalignments between the radial compressor rotor and diffuser and between the compressor rotor and associated cover plate occur as a result of the operation of the gas turbine engine.

Yet another advantage of the present invention resides in the fact that the compressor rotor and stator "grow" or expand in the same direction as a result of thermal expansion.

A still further advantageous feature of the present invention resides in the fact that negligible axial differential expansions occur in a vicinity of labyrinth seals provided at a front of the turbine rotor.

Another advantage of the present invention resides in the fact that small axial differential expansions occur between the rotor and stator of the compressor turbine during an operation of the gas turbine engine.

While the two components of the bearing spider can be flanged together and, for example, bolted, it is also possible in accordance with the present invention to solder or weld the joints between the two components. Moreover, if necessary or desired, interchangeability of the part of the distributor of the radial compressor which is subject to radial flow can, in accordance with the present invention, be sacrificed or eliminated in the interests of improved production costs.

Accordingly, it is an object of the present invention to provide a gas turbine engine which avoids by simple means the drawbacks and disadvantages encountered in the prior art.

Another object of the present invention resides in providing a gas turbine engine which is suitable for driving motor vehicles, tracked vehicles such as, for example, tanks, and for driving aircraft, helicopters, as well as for stationary applications.

Yet another object of the present invention resides in providing a gas turbine engine which minimizes the axial deformation between the bearing and housing of the engine, as well as minimizing axial misalignment between the compressor rotor, diffuser and cover plate.

A still further object of the present invention resides in providing a gas turbine engine which functions reliably under all operating conditions.

Yet another object of the present invention resides in providing a gas turbine engine in which thermal expansions of the rotor and stator occur in the same direction and in which axial differential expansions between the rotor and stator of the compressor turbine are minimized.

Still another object of the present invention resides in providing a gas turbine engine which minimizes axial differential expansions at labyrinth seals arranged in the front of the turbine rotor.

Figure 2:
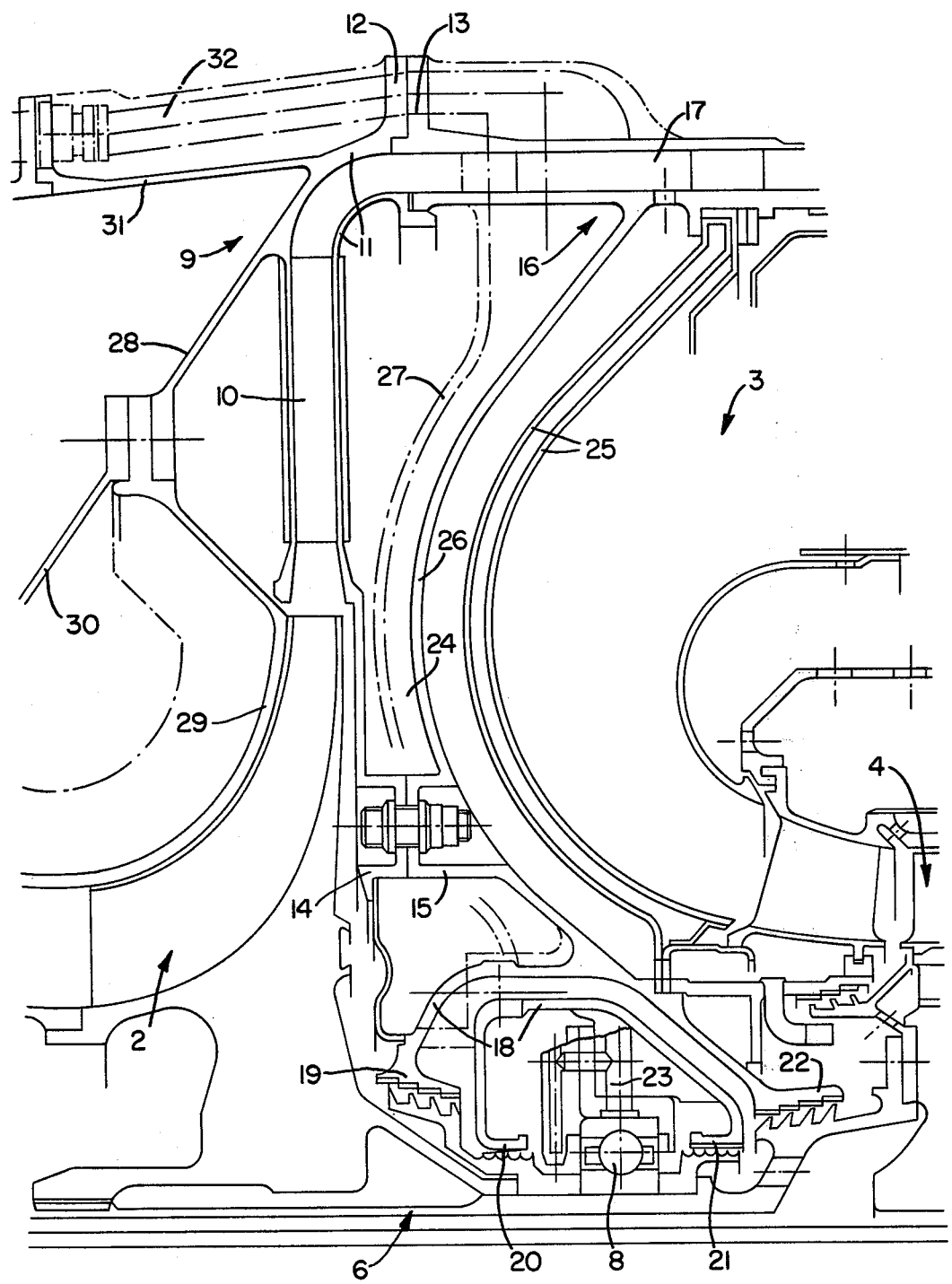

These and other objects, features and advantages of the present invention become more apparent from the following description when taken in connection with the accompanying drawings which show, for the purposes of illustration only, one embodiment in accordance with the present invention, and wherein:

FIG. 1 is a longitudinal partially schematic view of a gas turbine engine in accordance with the present invention; and FIG. 2 is a longitudinal partially schematic view, on an enlarged scale, of a detail of the gas turbine engine of FIG. 1 illustrating a radial compressor, fixed bearing, compressor drive turbine, and a portion of an annular combustion chamber.

Referring now to the drawings wherein like reference numerals are used in both views to designate like parts and, more particularly, to FIG. 1, according to this figure, a gas turbine engine is provided which includes a multi-stage axial compressor generally designated by the reference numeral 1 having adjustable guide blades, a radial compressor generally designated by the reference numeral 2, a reversing annular combustion chamber generally designated by the reference numeral 3, a compressor drive turbine generally designated by the reference numeral 4, and a free-power turbine generally designated by the reference numeral 5 which is mechanically independent of the drive turbine 4.

A gas generator rotor generally designated by the reference numeral 6 is mounted on the compressor side in a movable bearing 7 arranged between the radial compressor 2 and the compressor turbine 4, i.e., behind the radial compressor 2 and forward of the compressor drive turbine 4, as viewed in a flow direction. A bearing spider is provided for a fixed bearing 8 and is formed of a box construction so as to render the bearing spider resistant to axial forces.

As shown most clearly in FIG. 2, the box construction of the bearing spider includes a first component generally designated by the reference numeral 9 which comprises a section 10 of a radial compressor diffuser and an elbow 11. The section 10 provides for radial flow with the elbow deflecting the flow through 90° to convert such flow to axial flow. The first component 9 is connected to a second component generally designated by the reference numeral 16 by at least two flanges 12-13, 14-15, which are disposed at different diametrical positions with respect to the longitudinal axis of the gas turbine engine.

The second component 16 includes a section 17 of the radial compressor diffuser which is connected to an end of the elbow 11 and which is subject to an axial flow. Additionally, the second component 16 includes the complete bearing box 18 of the fixed bearing 8 with all stationary sealing elements 19, 20, 21, 22 and supply lines generally designated by the reference numerals 23, 24 which supply a lubricant or oil to the fixed bearing 8.

Between the section 17 of the radial compressor diffuser subject to axial flow and the bearing box 18 of the fixed bearing 8, the second component 16 is constructed or formed as a conical shell 26 which essentially follows the contour of a combustion chamber housing 25 with the conical shell 26 bulging or extending outwardly in a direction toward the radial compressor 2. The conical shell 26 is provided on a side facing the radial compressor 2 with a plurality of spaced hollow ribs 27 with one or more of such ribs serving to supply a lubricant to the fixed bearing 8. The hollow ribs 27 not only serve as a lubricant supply line, but also simultaneously serve as a means for reinforcing the second component 16 against axial deformation. The shell 26 is arranged coaxial with respect to the longitudinal axis of the engine.

A stiffening section or member 28 is provided for mounting the first component 9. The first component 9 together with a cover plate 29 of radial compressor 2 are mounted on a strut 30 with the first component 9 being integrated into a housing structure of the engine by a further section or member 31.

An outer supply line 32 is connected to and communicates with one or more of the hollow ribs 27 so as to provide a lubricant or oil feed to, for example, the fixed bearing 8.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

The use of an inlet bearing spider or generally a bearing spider is conventional in gas turbine engines (see: U.S. Pat. No. 3,269,114 or British patent specification No. 783,970).

I claim:

1. A gas turbine engine which includes a radial compressor means, a reversing annular combustion chamber means, a compressor drive turbine means, and a gas generator rotor means, characterized in that a fixed bearing means is disposed between the compressor means and the compressor drive turbine means for rotatably mounting the gas generator rotor means in the engine, a bearing spider having a box construction for resisting axial forces is provided for said fixed bearing means, a radial compressor diffuser means is operatively associated with said radial compressor means, the bearing spider means includes a first component and a second component, means are provided for connecting said first component to said second component, said first component includes a portion of the radial compressor diffuser means which is subjected to a radial flow and an elbow means for deflecting the radial flow so as to convert the same to an axial flow, said second component includes a portion of the radial compressor diffuser means which is subjected to an axial flow, said portion of the radial compressor diffuser means is connected to an end of said elbow means, said second component further includes a bearing box means for accomodating the fixed bearing means, a sealing means for sealing the bearing box means, and supply line means for suppling a lubricant to said bearing box means, and in that a portion of said second component is disposed between the section of the radial compressor diffuser means subjected to the axial flow and said bearing box means, said portion of said second component being formed as a conical shell which essentially follows a contour of a portion of a housing of the reversing annular combustion chamber means, said contour extending outwardly in a direction toward the radial compressor means.

2. A gas turbine engine according to claim 1, characterized in that means are provided for reinforcing said second component against axial deformation.

3. A gas turbine engine according to claim 2, characterized in that said reinforcing means includes a plurality of spaced ribs provided on a side of said conical shell facing said radial compressor means.

4. A gas turbine engine according to claim 3, characterized in that said spaced ribs are hollow, and in that at least one of said hollow ribs communicates with a lubricant supply means and said bearing box means so as to function as a supply line means to said bearing box means.

5. A gas turbine engine according to claim 4, characterized in that said means for connecting said first and second components includes at least two flanges arranged at different diametrical positions with respect to a longitudinal axis of the gas turbine engine.

6. A gas turbine engine according to claim 5, characterized in that a free-power turbine means is provided in the gas turbine engine, said free-power turbine means is mechanically independent of the compressor drive turbine means.

7. A gas turbine engine which includes a combined axial-radial compressor means, a reversing annular combustion chamber means, a compressor drive turbine means, and a gas generator rotor means, characterized in that a fixed bearing means is disposed between the compressor means and the compressor drive turbine means for rotatably mounting the gas generator rotor means in the engine, a bearing spider having a box construction for resisting axial forces is provided for said fixed bearing means, a compressor diffuser means is operatively associated with said axial-radial compressor means, the bearing spider means includes a first component and a second component, said first component includes a portion of the compressor diffuser means which is subjected to a radial flow, said second component includes a portion of the compressor diffuser means which is subjected to an axial flow, a bearing box means for accomodating the fixed bearing means, sealing means for sealing said bearing box means, and supply line means for supplying a lubricant to said bearing box means, and in that a portion of said second component is disposed between a section of the compressor diffuser means subjected to an axial flow and said bearing box means, said portion of said second component being formed as a conical shell which essentially follows a contour of a portion of a housing of the reversing annular combustion chamber means, the contour of said conical shell extending outwardly in a direction toward the axial-radial compressor means.

8. A gas turbine engine according to claim 7, characterized in that means are provided for reinforcing said second component against axial deformation.

9. A gas turbine engine according to claim 8, characterized in that said reinforcing means includes a plurality of spaced ribs provided on a side of said conical shell facing said axial-radial compressor means.

10. A gas turbine engine according to claim 9, characterized in that said spaced ribs are hollow, and in that at least one of said hollow ribs communicates with a lubricant supply means and said bearing box means so as to function as a supply line means for said bearing box means.

11. A gas turbine engine according to claim 10, characterized in that said means for connecting said first and second components includes at least two flanges arranged at different diametrical positions with respect to a longitudinal axis of the gas turbine engine.

12. A gas turbine engine according to claim 11, characterized in that a free-power turbine means is provided in the gas turbine engine, said free-power turbine means is mechanically independent of the compressor drive turbine means.

13. A gas turbine engine according to claim 1, characterized in that a free-power turbine means is provided in the gas turbine engine, said free-power turbine means is mechanically independent of the compressor drive turbine means.

14. A gas turbine engine according to claim 13, characterized in that means are provided for reinforcing at least a portion of said second component against axial deformation.

15. A gas turbine engine according to claim 14, characterized in that said reinforcing means includes a plurality of spaced ribs provided on said second component.

16. A gas turbine engine according to claim 15, characterized in that said spaced ribs are hollow, and in that at least one of said hollow ribs forms a lubricant supply line for the fixed bearing means.

* * * * *